US007617498B1

(12) United States Patent
Lumsden (10) Patent No.: US 7,617,498 B1
(45) Date of Patent: Nov. 10, 2009

(54) RESOURCE CONFLICT MANAGEMENT USING PREDEFINED XML SCHEMAS

(75) Inventor: John Lumsden, Ottawa (CA)

(73) Assignee: Nortel Networks Limited, St. Laurent, Quebec (*) Notice: Subject to any disclaimer, the term of this patent is extended or adjusted under 35 U.S.C. 154(b) by 1097 days.

(21) Appl. No.: 10/941,718

(22) Filed: Sep. 15, 2004

(51) Int. Cl.
*G06F 9/46* (2006.01)
*G06F 15/173* (2006.01)
*G06F 17/00* (2006.01)

(52) U.S. Cl. .................... 718/104; 707/100; 709/223; 709/226

(58) Field of Classification Search .................. 718/100, 718/102, 104; 707/1, 100; 709/223–226
See application file for complete search history.

(56) References Cited

U.S. PATENT DOCUMENTS

| | | | | | |
|---|---|---|---|---|---|
| 4,387,427 | A | * | 6/1983 | Cox et al. .................... | 718/102 |
| 4,890,227 | A | * | 12/1989 | Watanabe et al. ............. | 706/14 |
| 5,329,626 | A | * | 7/1994 | Klein et al. .................. | 709/248 |
| 5,404,516 | A | * | 4/1995 | Georgiades et al. ......... | 718/104 |
| 5,812,844 | A | * | 9/1998 | Jones et al. .................. | 718/104 |
| 5,838,968 | A | * | 11/1998 | Culbert ....................... | 718/104 |
| 6,003,061 | A | * | 12/1999 | Jones et al. .................. | 718/104 |
| 6,282,561 | B1 | * | 8/2001 | Jones et al. .................. | 718/104 |
| 6,317,774 | B1 | * | 11/2001 | Jones et al. .................. | 718/107 |
| 6,393,433 | B1 | * | 5/2002 | Kalavade et al. ............. | 707/200 |
| 6,490,612 | B1 | * | 12/2002 | Jones et al. .................. | 718/107 |
| 6,542,920 | B1 | * | 4/2003 | Belkin et al. ................ | 718/104 |
| 6,584,489 | B1 | * | 6/2003 | Jones et al. .................. | 718/104 |
| 7,058,947 | B1 | * | 6/2006 | Raja et al. .................... | 718/104 |
| 2002/0007389 | A1 | * | 1/2002 | Jones et al. .................. | 709/104 |
| 2002/0007408 | A1 | * | 1/2002 | Kalhour ....................... | 709/225 |
| 2002/0161750 | A1 | * | 10/2002 | Rajarajan et al. .............. | 707/3 |
| 2003/0033411 | A1 | * | 2/2003 | Kavoori et al. .............. | 709/226 |
| 2005/0033846 | A1 | * | 2/2005 | Sankaranarayan et al. .. | 709/226 |
| 2005/0044205 | A1 | * | 2/2005 | Sankaranarayan et al. .. | 709/223 |
| 2005/0114485 | A1 | * | 5/2005 | McCollum ................... | 709/223 |
| 2006/0080412 | A1 | * | 4/2006 | Oprea et al. ................. | 709/220 |
| 2006/0080413 | A1 | * | 4/2006 | Oprea et al. ................. | 709/220 |
| 2007/0083868 | A1 | * | 4/2007 | Sankaranarayan et al. .. | 718/104 |
| 2008/0086731 | A1 | * | 4/2008 | Trossman et al. ........... | 718/100 |

* cited by examiner

*Primary Examiner*—Meng-Ai An
*Assistant Examiner*—Jennifer N To
(74) *Attorney, Agent, or Firm*—Ridout & Maybee LLP (57) ABSTRACT

A method and system for identifying conflicting resource claims by applications for a system having a plurality of resources. A set of schemas are predefined for the system, wherein each schema defines a pooling of the resources of the system. Each application is then created based upon one of the schemas so as to be associated with a specified pool or subset of device resources. Applications are executed by a browser. Each application may have more than one state, and each state may have an associated schema. Requests for changes of state, such as invoking an instance of the application, are received by the browser. The browser informs a resource manager of the associated schema and the resource manager identifies the pool or subset of resources for requested state change based upon its schema and determines whether or not the resources are currently in use by another active application. Conflicts may be resolved by a conflict resolution component.

17 Claims, 5 Drawing Sheets

RESOURCE CONFLICT MANAGEMENT USING PREDEFINED XML SCHEMAS

FIELD OF THE APPLICATION

This invention relates to resource management and, in particular, to supporting resource allocation and identifying resource conflicts in a dynamic multi-application system.

BACKGROUND OF THE INVENTION

A system may serve a number of applications. For example, a corporate system may serve multiple users, such a unified messaging server. A personal system may support a variety of applications for a single user, such as a personal computer that may act as a soft phone, web browser, speech recognizer, word processor, etc. In any multi-application system, the resource requirements of an application must be known in order to manage allocation of resources between applications, recognize resource conflicts, and manage application behaviour based on resource availability.

Accordingly, there is a need for a method and/or system for supporting resource management and for identifying resource conflicts between applications.

SUMMARY OF THE APPLICATION

The present application describes a method and system for supporting resource management and for identifying resource conflicts between applications. Applications on a system are written in an eXtensible Markup Language (XML) defined to expose system resources and capabilities to an application layer. A set of schemas are provided that define pools or groups of resources. Each application is written in accordance with one of the schemas, and the selected schema defines the pool of resources available to the application. In some cases, an application may have a schema associated with each state of its operation, since in different states the application may consume different resources.

A browser and a resource manager identify any conflicts between an application seeking a state change and the current status of resources on the system. For example, existing instances of applications may have control a set of system resources. When an application seeks a state change, such as initiation of a new instance of the application, then the resource manager determines, based upon the schema associated with the application, whether or not the resources required by the application are available. Conflicts may be resolved by a conflict determination component.

In one aspect, the present application provides a method of identifying resource conflicts in a system including a device having a plurality of resources. The method includes steps of providing a plurality of schemas, each schema defining a pooling of one or more resources, and receiving a state change request from a first application, the first application conforming to a selected one of the schemas. It also includes steps of identifying, based upon the selected schema, a resource required by the first application as a result of the state change request, and determining whether the requested resource is currently in use by a second application.

In a further aspect, the present application provides a system including a device having a plurality of resources. The system includes a plurality of schemas, each schema defining a pooling of one or more of the resources, a resource manager, and a first application, the first application conforming to a selected one of the schemas. The system also includes a browser for receiving a state change request for the first application and notifying the resource manager of the selected schema, wherein the resource manager includes a conflict determination component for determining whether the pooling of resources defined for the selected schema includes a resource currently in use by a second application.

Other aspects and features of the present application will become apparent to those ordinarily skilled in the art upon review of the following description of specific embodiments in conjunction with the accompanying figures.

BRIEF DESCRIPTION OF THE DRAWINGS

Reference will now be made, by way of example, to the accompanying drawings which show an embodiment of the present application, and in which.

Similar reference numerals are used in the figures to denote similar components.

DESCRIPTION OF SPECIFIC EMBODIMENTS

The embodiments of a system or method for identifying conflicting resource claims are described below in the context of a system having a plurality of resources and more than one application that could potentially request access to the resources. In one aspect, the following description provides for a system having an application that informs the system of the specific pool of resources required by the application. Accordingly, the system may identify when a new application requires a pool of resources that includes a resource already in use by another application, i.e. it may identify conflicting claims for use of the resource.

Applications on a system are written in an XML markup language defined to expose system resources and capabilities to an application layer. A set of schemas are provided that define pools or groups of resources. Each application is written in accordance with one of the schemas, and the selected schema defines the pool of resources available to the application. In some cases, an application may have a schema associated with each state of its operation, since in different states the application may consume different resources. An application's access to resources and the manner in which it accesses those resources is restricted to the subset specified by its associated schema.

The set of schemas may be created to pool together commonly used resources. A given schema may include all resources on the device. Another schema may only include one resource on the device. Many schemas may include a subset of the total device resources. An application developer chooses a schema based upon the resources that the developer intends for the application to use. Typically, an application developer will choose a schema defining the minimum subset of resources that the application will require so as to minimize the application's "resource footprint" and, thus, the potential for conflicts with other applications.

The applications may be written in the markup language created to expose resources to the application layer. In general, the markup language will be a single common markup language for the entire underlying system. In addition, applications specifically reference, and are written in accordance with, a specified one of the schemas. The schema restricts the resources that an application may consume and restricts the manner in which the application interacts with a resource. For example, an application may be entitled to read a file from a disk, but may not be entitled to write a file to the disk.

Figure 1:
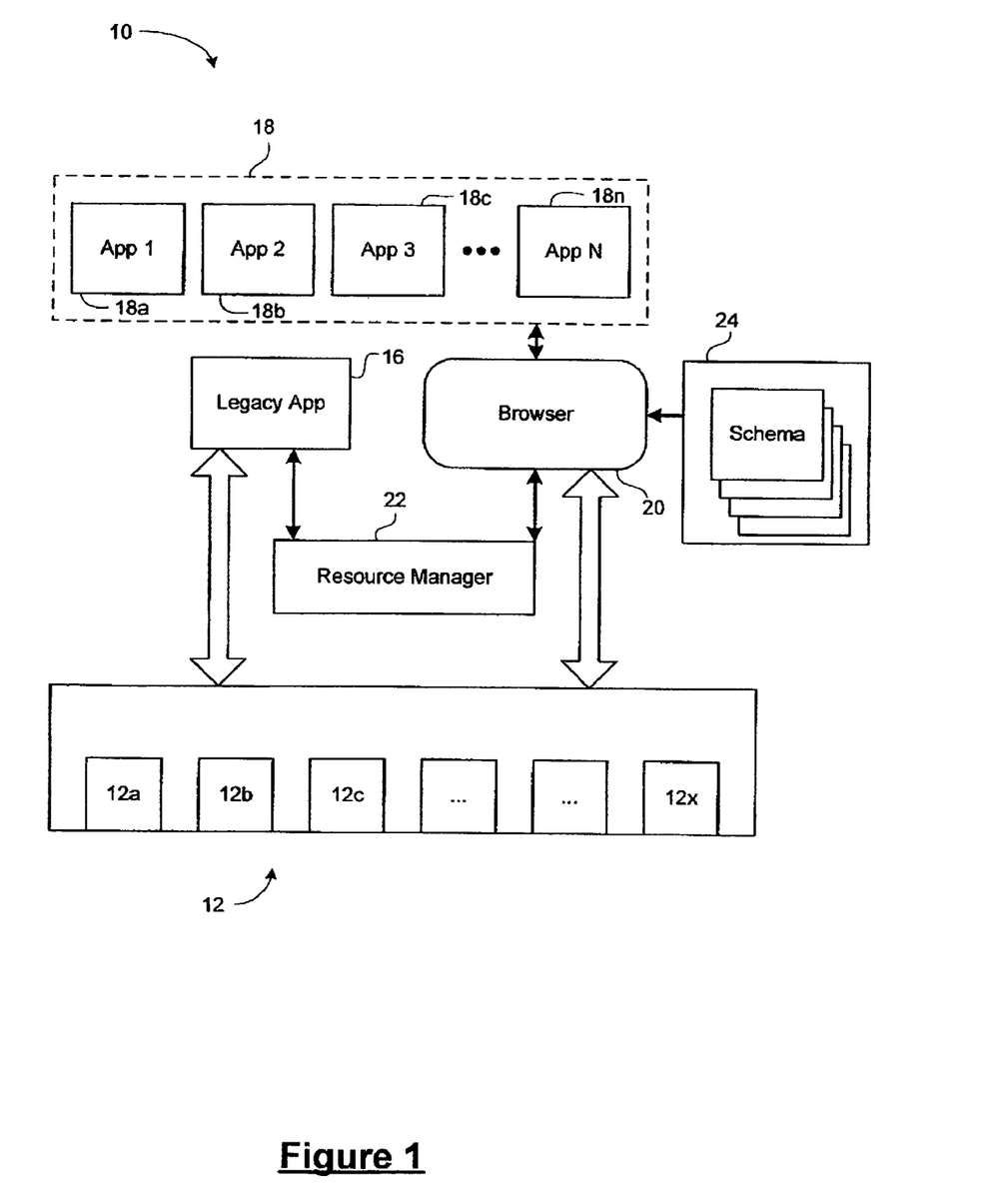
FIG. 1 shows a block diagram of a system having a plurality of resources.

Reference is first made to FIG. 1, which shows a block diagram of a system 10 having a plurality of resources 12 (shown as 12a, 12b, 12c, . . . , 12x). The system 10 further includes a number of applications 18 (shown individually as 18a, 18b, . . . , 18n) and an engine or browser 20 for executing the applications 18. The applications 18 are created using a predetermined mark-up language understood by and executable by the browser 20.

The system 10 also includes a resource manager 22 in communication with the browser 20 for identifying conflicting claims for resources 12 between multiple applications 18 and, in some embodiments, performing conflict resolution.

The applications 18 are created based upon schemas 24 each predefining a pool of selected resources 12. Based upon the schema 24 used as the basis for the application 18, the browser 20 will be aware of the specific resources 12 required by the application 18. Accordingly, the browser may alert the resource manager 22 to the specific resources 12 required by an application 18 or to the schema 24 used by the application 18. The resource manager 22 may then determine whether any of the specific resources 12 are already in use by another application 18.

The system 10 may further include one or more legacy applications 16 not created in accordance with the predetermined mark-up language. A legacy application 16 may include an application created to operate upon the system prior to the introduction of a browser and the mark-up language, i.e. it may be an application from an earlier generation system. Because legacy applications 16 are not created in accordance with the predetermined mark-up language, they are not executed by the browser 20 and, accordingly, do not conform to one of the schemas 24. Accordingly, the resource requirements of legacy applications 16 may be "hard coded" into the resource manager 22. In one embodiment, this is accomplished by creating a "pseudo schema" defining the resource requirements of the legacy application 16. The resource manager 22 uses the "pseudo schema" to determine resource consumption in the same fashion as it does with regular applications and schemas.

Applications 18 may be invoked or launched in response to a triggering or input event. In response to the triggering or input event the browser 20 accesses the schema 24 associated with the application 18. The browser 20 requests permission from the resource manager 22 to execute the application 18, and it passes the resource manager 22 the associated schema 24. The application 18 may have specific resources associated with it or, in another embodiment, the resource manager 22 may assign resource instances to it. For example, the application 18 requests an interactive voice response (IVR) resource and the resource manager returns a specific IVR resource.

The resource manager 22 determines whether the resources required by the application 18 are already in use. The resource manager 22 maintains a 'context' for the user device, i.e. a snapshot of the state of each application 18 for the user device. The context for the device includes information on which resources are 'owned' or 'occupied' by which applications 18.

If the resource manager 22 determines that the requested resources are available, then it informs the browser 20, which initiates execution of the application 18. If the resource manager 22 determines that the requested resources are not available, then it may invoke a conflict resolution process. The conflict resolution process may apply a priority scheme, logic rules, a neural network, or any other decision-making mechanisms for determining which of two applications should be entitled to access a resource. The conflict resolution process may rule that the application 18 is entitled to access the resource, in which case the resource manager 22 informs the browser 20 and the browser 20 continues with execution of the application 18. If the application 18 is denied access to the resource, then the browser 20 is informed and it declines to execute the application 18.

During execution, the browser 20 continues to enforce the resource restrictions imposed on an application 18 by its associated schema 24. If a rogue application requests a resource which it does not own, or attempts to execute a disallowed operation, the browser 20 may terminate the application 18.

In one example embodiment, the system 10 is for implementing a user telephone set and the resources 12 comprise the telephone set resources. The telephone set resources may include, for example, a speaker, a microphone, a display screen (or portions of a display screen), an input keypad, incoming and outgoing media paths, and other resources. The applications may include a voice mail application, a call recording application, and/or information display applications, such as stock exchange quote application. Other possible applications will be apparent to those or ordinary skill in the art.

In the example of a telephone set, the legacy applications 16 may include a call processing application and/or a set administration application. The call processing application performs functions directly related to establishing voice calls, such as providing dial-tone, receiving and processing digit entry from the key pad, associated signaling and setting up of the media paths. The set administration application relates to functions such as setting the ring cadence, microphone volume, speaker volume, and other administrative settings independent from or transparent to call processing.

In order to initiate an application, a telephone set may accept input from a user. For example, a telephone set may include a dedicated button for launching a voice mail application. In another embodiment, a telephone set may feature a key combination for launching a recording application for recording the audio of an ongoing voice call. In yet another embodiment, the telephone set may launch a voice activated dialing application based upon detection of an off-hook condition, i.e. when the user picks up the handset or selects an outgoing line.

Figure 5:
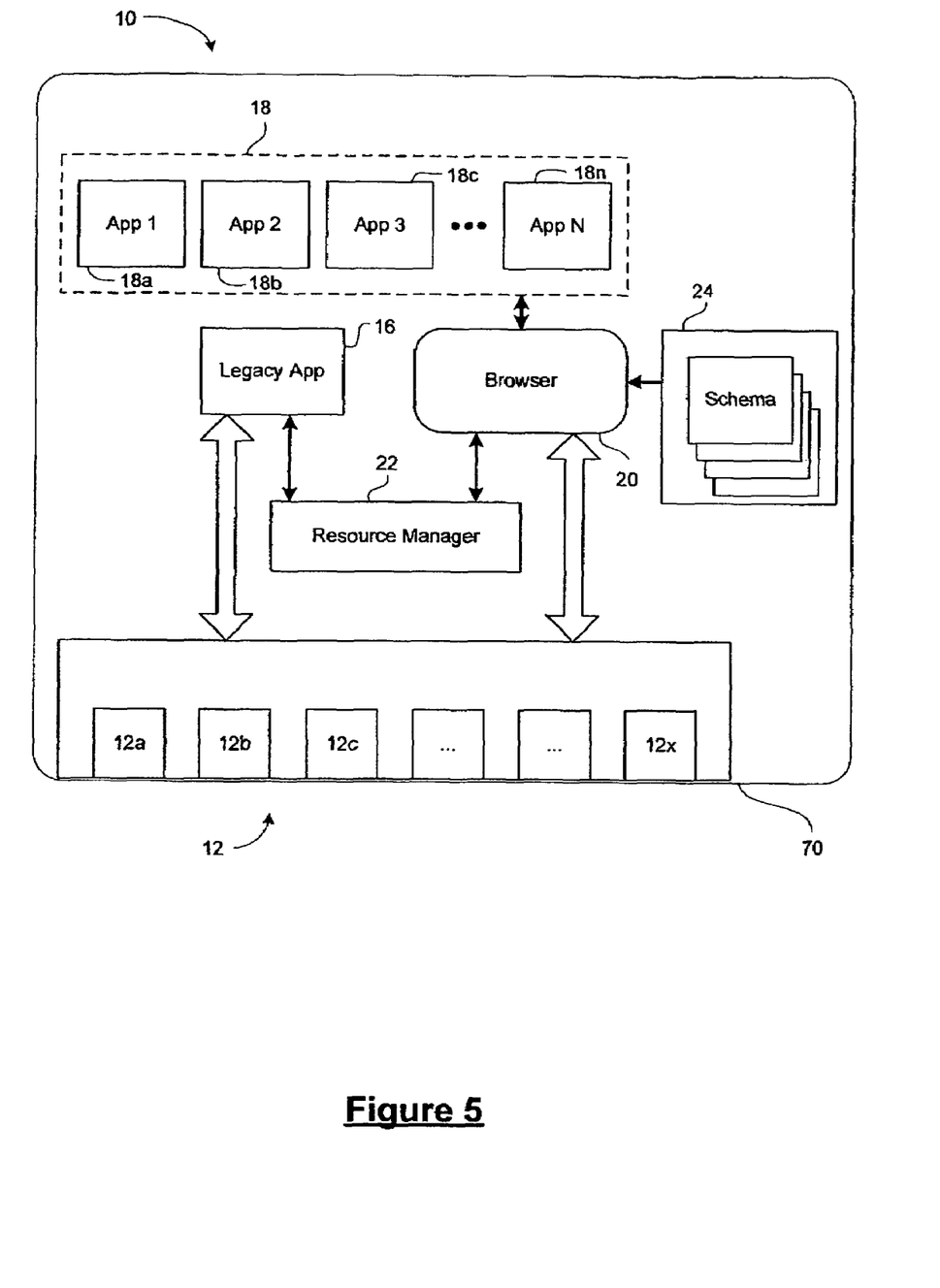
FIG. 5 shows a block diagram of a user device incorporating the system of FIG. 1.

Reference is now made to FIG. 5, which shows a block diagram of a user device 70 underlying the system 10 of FIG. 1. The user device 70 includes the resources 12, the resource manager 22, the applications 18 and the browser 20. In some embodiments, the user device 70 is coupled to a communication network. Through the communication network the user device 70 may access additional applications, which are not resident on the user device 70 itself. In one embodiment, the user device 70 may comprise a telephone set.

Figure 6:
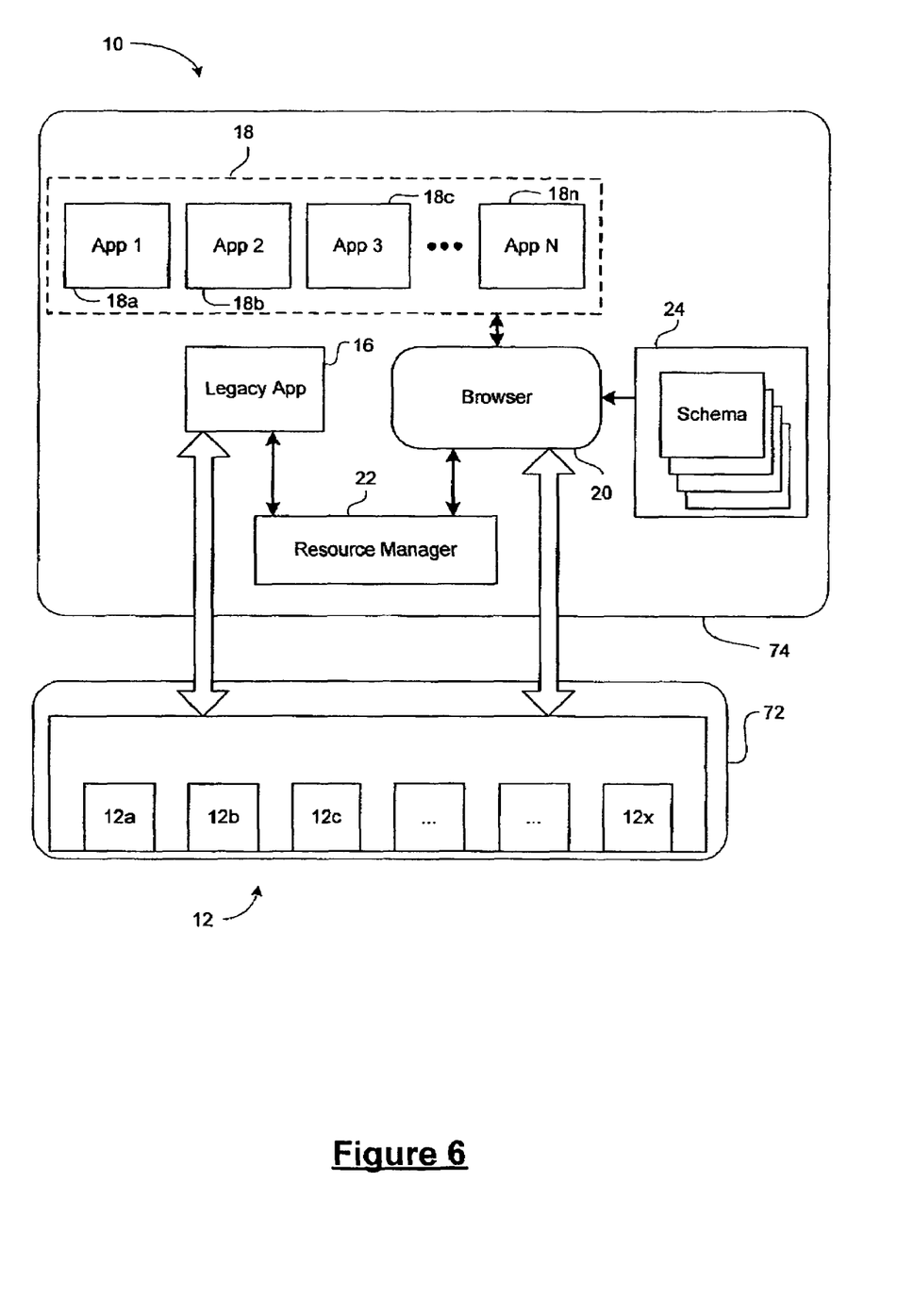
FIG. 6 shows a block diagram of the system of FIG. 1 embodied in a user device and a proxy server.

Reference is also made to FIG. 6, which shows a block diagram of the system 10 of FIG. 1 embodied in a user device 72 and a proxy server 74. The user device 72 includes the resources 12 and the proxy server 74 includes the remainder of the system 10, such as the applications 18, the resource manager 22, and the browser 20.

Figure 2:
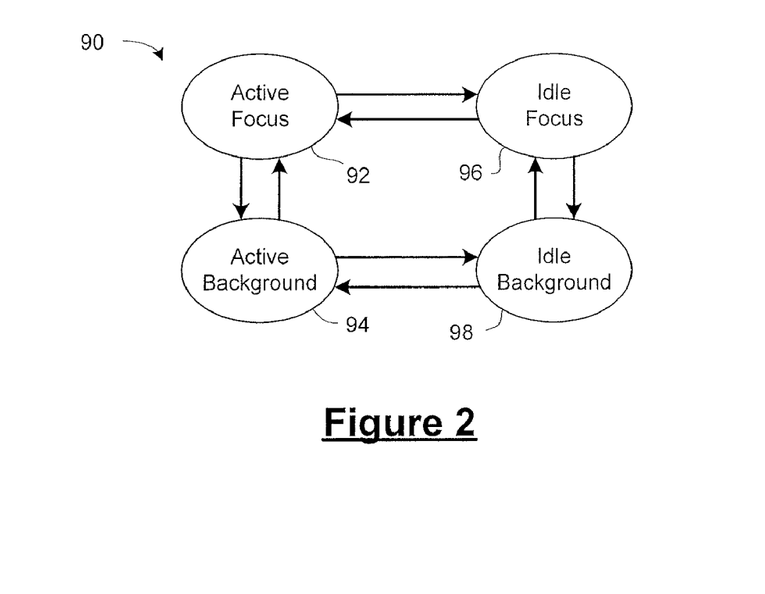
FIG. 2 diagrammatically shows a state diagram for applications within the system.

Reference is now made to FIG. 2, which diagrammatically shows a state diagram 90 for the applications 18 (FIG. 1). An application 18 may have more than one state. In different states, the application 18 may have different resource requirements. For example, in an active state the application may consume more resources that in a sleep or dormant state. Accordingly, in one embodiment, each application state has an associated schema 24 (FIG. 1), and the resource manager 22 evaluates the availability of resources with each request to transition from one application state to another.

The state diagram 90 illustrates that, in one embodiment, an application 18 may be in one of four possible states: an active focus state 92, an active background state 94, an idle focus state 96, and an idle background state 98. Other embodiments may have more, fewer, or different states.

The active focus state 92 corresponds to an active application having primary control over a substantial number of resources on the set, i.e. the foreground application. The active focus state 92 is a state in which the application is the main application interacting with a user. This may include, in the example of a telephone set, the call processing application during an active voice call. In this state, the call processing application has control over the microphone, the speaker, and the incoming and outgoing media paths.

An application may be in an active state without being in the foreground, in which case it is in the active background state 94. An example of this type of situation is a call recording application that is operating during an active voice call. In this situation, the call processing application is in the active focus state 92 and the call recording application is in the active background state 94.

An application may switch from the active focus state 92 to the idle focus state 96. The idle focus state 96 is a state in which the application is awaiting a triggering event to go active. For example, a call processing application sits in the idle focus state 96 between calls, awaiting a trigger, such as the user picking up the handset or selecting an outgoing line.

Lastly, an application may be in the idle background state 98. In this state, the application is not running or consuming resources and is not in the 'foreground' on the set.

The sum of application states 92-98 on a set or device makes up the context of the device. The context is a snapshot or overall picture of the resource availability of the device. There is an explicit relationship between application state and resource ownership, as defined by the schema associated with each application state, meaning that the system context provides a map of which system resources are owned by which application. It is this context that the resource manager 22 maintains and uses to determine whether resources are available for a requested application state change.

Figure 3:
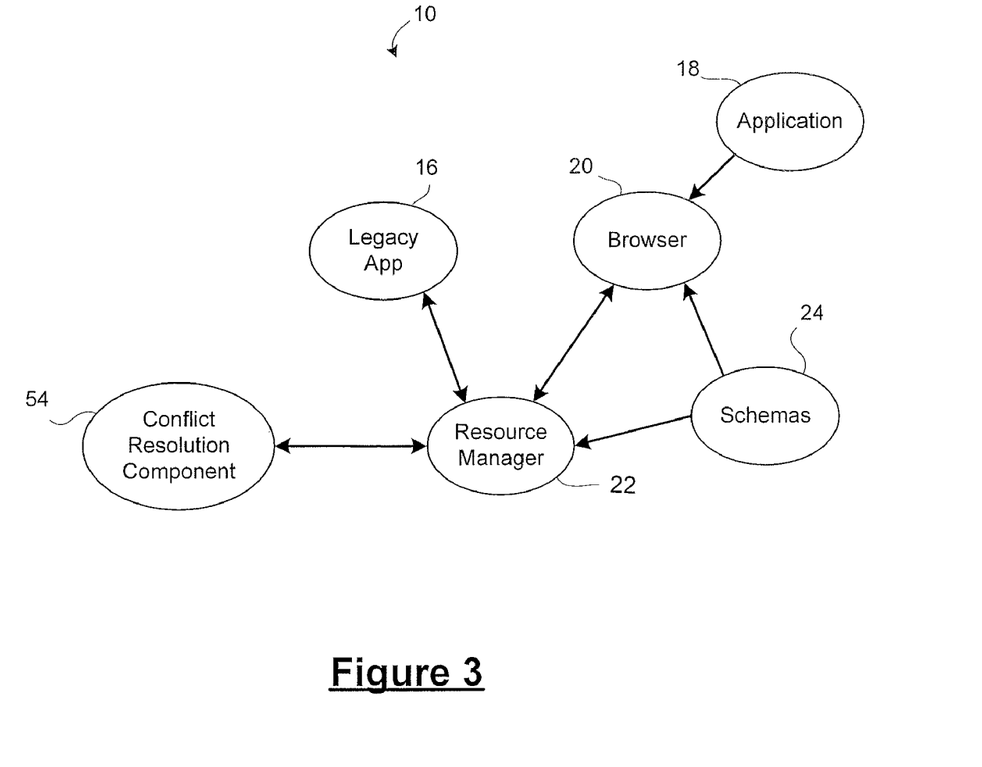
FIG. 3 diagrammatically shows a portion of the system from FIG. 1 in greater detail.

Reference is now made to FIG. 3, which diagrammatically shows a portion of the system 10 from FIG. 1. The system 10 may include a conflict resolution component 54.

A browser-based application 18 or a legacy application 16 may wish to initiate a state change. The application 18, 16 requests permission from the resource manager 22. For a browser-based application 18 this includes having the browser 20 identify the associated schema 24 and pass the associated schema 24 to the resource manager 22 along with the state change request. For a legacy application 16, this may include requesting a state change and having the resource manager 22 access the associated pseudo schema. In another embodiment, the resource manager 22 need not retrieve and parse the associated schema 24 because it maintains a static description of each schema's resource requirements. In this embodiment, the resource manager 22 need only be notified of the identity of the associated schema 24.

The context of the device indicates whether or not the resources are in use. The resource manager 22 compares the resources requested by the application with the system context to determine if the requested resources are available. If the resources are available, then the resource manager 22 informs the browser 20 that it may start execution of the application 18, and it updates its view of the system context to note that the application 18 is now the owner of the requested resources. In some embodiments, the resource manager 22 may also return the identity of the resources that the application now owns. When an application stops or transitions to a new state which requires fewer resources, then permission is automatic and the context is again updated to reflect the change in resource ownership. When an application starts or transitions to a state requiring new resources, the resource manager 22 perform the described comparison with the system context. If a conflict is detected because one or more of the resources are in use by another application, then the resource manager 22 may invoke or notify the conflict resolution component 54.

The conflict resolution component 54 evaluates the competing claims for access to the resources and determines which application should prevail. It may use a variety of logic rules or other mechanisms to determine which application should take precedence. The results of the conflict resolution are communicated from the conflict resolution component 54 to the resource manager 22, which then grants or denies permission for the requested state change. The results from the conflict resolution component 54 may indicate that the requested state change is to be denied or permitted. If permitted, then it may further indicate that another application is to be closed or forced to change state in order to free up the conflicted resource.

Figure 4:
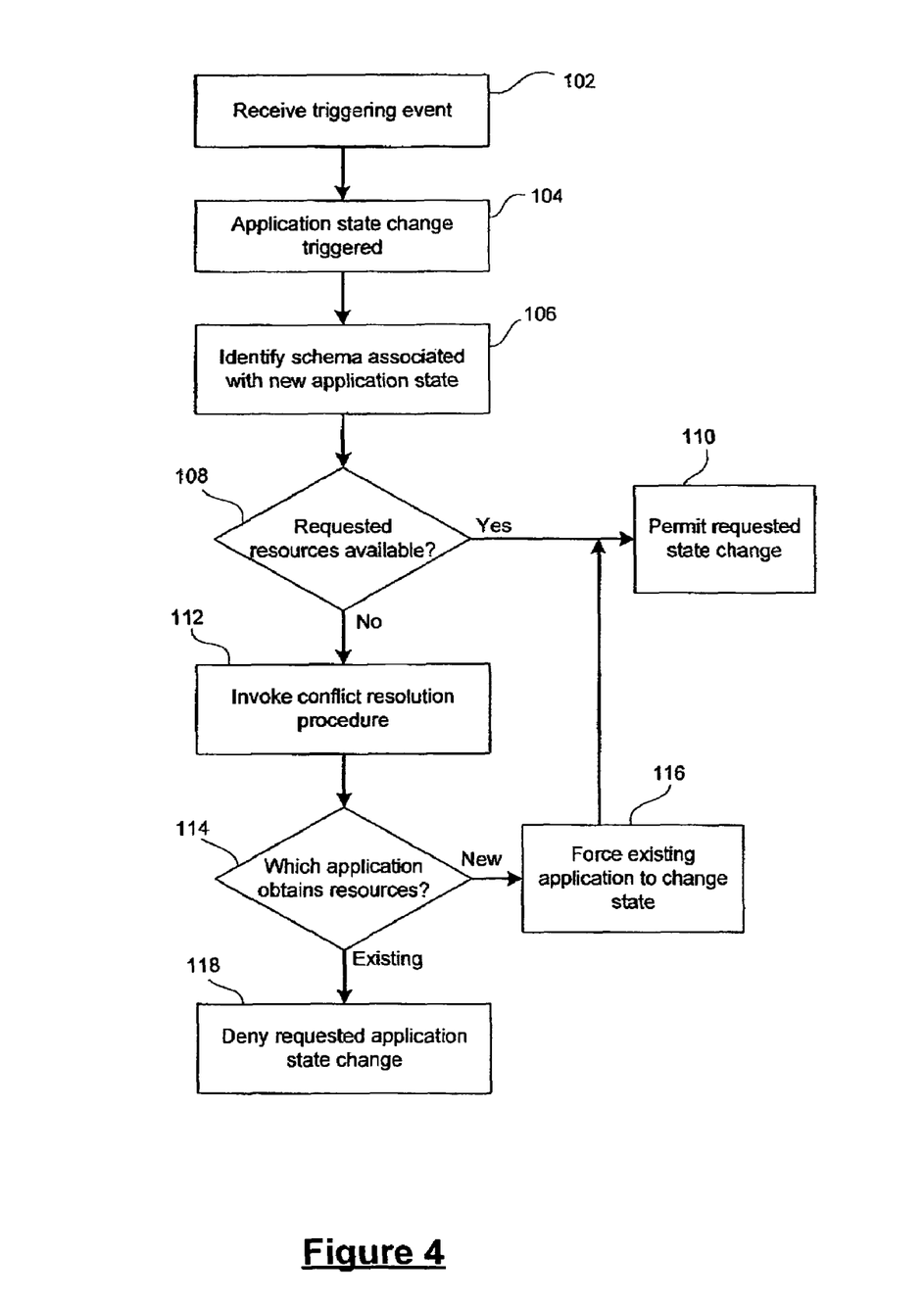
FIG. 4 shows, in flowchart form, a method for identifying conflicting resource claims.

Reference is now made to FIG. 4, which shows, in flowchart form, a method 100 for identifying conflicting resource claims. The method 100 is applicable for a system having multiple resources and more than one application which may be active concurrently. A number of schemas are provided, wherein the schemas define pools or groupings of the resources. Different schemas may include common resources. Different schemas may also place different restrictions upon the actions available to an application with respect to a common resource.

Each application is created based upon one of the schemas. The schema chosen by an application developer is a schema including a particular pool or group of resources that the application may require during operation.

The method 100 begins in step 102, wherein an input or triggering event occurs. This may include a user input event such as a keystroke on an input device like a keypad, or picking up a handset. It may also include events generated by an active application as a result of user interaction with the active application. Those of ordinary skill in the art will appreciate that there may be other types of input or triggering events.

The input or triggering event is associated with an application such that, in step 104, an application state change request is triggered. For example, the user selection of an outside line through pressing a line selection button may trigger a call processing application. The triggering of a requested application state change may include sending a message or document to the engine or browser 20 (FIG. 1). The browser 20 retrieves the schema 24 (FIG. 1) with which the requested application state is associated. The browser 20 identifies the associated schema 24 on the basis of a reference to the schema 24 in the markup language document implementing the application. In step 106, the browser 20 passes the identified schema 24 to the resource manager 22.

In step 108, the resource manager 22 determines the resources requested by the new application state and assesses whether or not the requested resources are available. Based upon the prevailing context of the device—i.e. the currently active applications that 'own' or 'occupy' resources on the device—the resource manager 22 determines whether or not there is a conflict between the request for resources from the new application and the existing active applications. If there is no conflict, then it is safe to allow the application state change and grant it access to the requested resources. In this case, the method 100 proceeds to step 110, wherein the resource manager 22 informs the browser 20 that the requested resources are available, and the browser 20 commences with execution of the state change.

If there is a conflict identified in step 108, then the method 100 proceeds to step 112, wherein the resource manager 22 invokes a conflict resolution process. Through an internally or externally implemented process, the resource manager 22 determines which of the two applications (the application attempting to change state or a different existing application) should be entitled to access the conflicted resource. At step 114, a decision is rendered using logic rules, a neural network, priority settings, or any other decision-making mechanisms that may be appropriate for determining which application should prevail. If the decision at step 114 is that the application undergoing a state change should gain access to the resources, then the existing active application is closed or terminated in step 116 and the method 100 continues to step 110, wherein the application state change is executed by the browser 20. If the decision is that the existing application should win out, then in step 118 the browser 20 is informed by the resource manager 22 that it should refuse execution of the state change.

Those or ordinary skill in the art will appreciate that certain steps of the foregoing method may be performed concurrently with other steps or in an alternative order, without substantially affecting the operation of the method.

The present application may be embodied in other specific forms without departing from the spirit or essential characteristics thereof. Certain adaptations and modifications of the above described embodiments will be obvious to those skilled in the art. Therefore, the above discussed embodiments are considered to be illustrative and not restrictive, the scope of the application being indicated by the appended claims rather than the foregoing description, and all changes which come within the meaning and range of equivalency of the claims are therefore intended to be embraced therein.

What is claimed is:

1. A method of identifying resource conflicts in a system including a device having a plurality of resources, the method comprising the steps of:
   providing a plurality of schemas, each schema defining a pooling of one or more resources;
   receiving a state change request from a first application, wherein said state chance request comprises a state chance of said first application from an idle state to an active state, and wherein said active state of said first application has an associated schema;
   in response to receiving said state change request, identifying, based upon said associated schema, a resource required by said first application in said active state, wherein identifying includes parsing said associated schema to obtain said pooling of one or more resources; and
   determining whether said requested resource is currently in use by a second application, wherein said second application comprises an application in an active state, and wherein determining includes finding that said requested resource is available; and
   executing said state change request.

2. The method claimed in claim 1, said second application being based upon a second of said schemas, and wherein said step of determining includes determining whether said second of said schemas includes said requested resource.

3. The method claimed in claim 1, wherein said step of determining includes finding that said requested resource is in use by said second application, and wherein the method includes a step, in response to said step of finding, of invoking a resource conflict resolution procedure.

4. The method claimed in claim 3, wherein said resource conflict resolution procedure includes determining whether said state change request should be allowed or refused.

5. The method claimed in claim 1, wherein said state change request is initiated in response to receipt of a triggering event.

6. The method claimed in claim 1, wherein the device includes a telephone set, and wherein the plurality of resources include a speaker, a microphone, a display, a keypad, and a media path.

7. The method claimed in claim 1, wherein said applications and said schemas include documents created using an XML language providing an application interface to the plurality of resources.

8. The method claimed in claim 1, wherein said requested state change relates to a requested state of said first application, and wherein said requested state is associated with said associated schema.

9. A system including a device having a plurality of resources, the system comprising:
   a plurality of schemas, each schema defining a pooling of one or more of the resources;
   a resource manager;
   a first application, said first application having an idle state and an active state, said active state having an associated scheme; and
   a browser for receiving a state change request for said first application and notifying said resource manager of said associated schema, wherein said state change request comprises a state change of said first application from the idle state to the active state,
   wherein said resource manager includes a conflict determination component for parsing said associated scheme to obtain said pooling of one or more resources, and for determining whether said pooling of resources defined for said associated schema includes a resource currently in use by a second application, wherein said second application comprises an application in an active state, wherein said conflict determination component determines that said pooling of resources defined for said associated schema is available, and wherein, in response to said determination, said resource manager notifies said browser and said browser executes said state chance request.

10. The system claimed in claim 9, said second application being based upon a second of said schemas, and wherein said conflict determination component determines whether said pooling of resources defined for said associated schema includes a resource that is included in said pooling of resources defined for said second schema.

11. The system claimed in claim 9, further including a conflict resolution component, and wherein said conflict determination component determines that at least one resource within said pooling of resources defined for said associated schema is unavailable, and wherein, in response to said determination, said resource manager invokes said conflict resolution component.

12. The system claimed in claim 11, wherein said conflict resolution component determines whether said state change request should be allowed or refused.

13. The system claimed in claim 9, wherein said device includes a user interface, and said device receives user input through said user interface, and wherein said state change request is triggered in response to said user input.

14. The system claimed in claim 9, wherein the device includes a telephone set, and wherein the plurality of resources include a speaker, a microphone, a display, a keypad, and a media path.

15. The system claimed in claim 9, wherein said applications documents created using an XML language providing an application interface to the plurality of resources.

16. The system claimed in claim 9, wherein said requested state change relates to a requested state of said first application, and wherein said requested state is associated with said associated schema.

17. The system claimed in claim 9, wherein said browser includes a component for determining if said first application requests access to a resource in violation of said associated schema.

* * * * *

UNITED STATES PATENT AND TRADEMARK OFFICE
CERTIFICATE OF CORRECTION

| | |
|---|---|
| PATENT NO. | : 7,617,498 B1 |
| APPLICATION NO. | : 10/941718 |
| DATED | : November 10, 2009 |
| INVENTOR(S) | : John Lumsden |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1431 days.

Signed and Sealed this

Nineteenth Day of October, 2010

David J. Kappos
*Director of the United States Patent and Trademark Office*